(12) United States Patent
Dubeyko et al.

(10) Patent No.: US 12,164,482 B2
(45) Date of Patent: Dec. 10, 2024

(54) OFFLOADING DATA PROCESSING INTO COMPUTATIONAL STORAGE USING JOURNALING

(71) Applicant: Lemon Inc., Grand Cayman (KY)

(72) Inventors: Viacheslav Dubeyko, Los Angeles, CA (US); Jian Wang, Beijing (CN)

(73) Assignee: Lemon Inc., Grand Cayman (KY)

( * ) Notice: Subject to any disclaimer, the term of this patent is extended or adjusted under 35 U.S.C. 154(b) by 130 days.

(21) Appl. No.: 17/738,579

(22) Filed: May 6, 2022

(65) Prior Publication Data

US 2023/0359591 A1    Nov. 9, 2023

(51) Int. Cl.
*G06F 16/18* (2019.01)
*G06F 12/02* (2006.01)

(52) U.S. Cl.
CPC ...... *G06F 16/1815* (2019.01); *G06F 12/0223* (2013.01); *G06F 2212/7201* (2013.01)

(58) Field of Classification Search
None
See application file for complete search history.

(56) References Cited

U.S. PATENT DOCUMENTS

| | | | | |
|---|---|---|---|---|
| 9,467,460 | B1* | 10/2016 | Otvagin | H04L 63/1441 |
| 11,650,748 | B1* | 5/2023 | Dubeyko | G06F 3/0664 |
| | | | | 711/154 |
| 11,789,822 | B1* | 10/2023 | Dubeyko | G06F 3/0631 |
| | | | | 711/103 |
| 2018/0113631 | A1* | 4/2018 | Zhang | G06F 3/0613 |
| 2021/0133037 | A1* | 5/2021 | Behera | G06F 11/1464 |
| 2022/0206715 | A1* | 6/2022 | Kim | G06F 3/0656 |
| 2023/0376242 | A1* | 11/2023 | Dubeyko | G06F 3/0616 |

* cited by examiner

*Primary Examiner* — Charles Rones
*Assistant Examiner* — Ryan Dare
(74) *Attorney, Agent, or Firm* — BakerHostetler

(57) ABSTRACT

The present disclosure describes techniques for improving data processing. At least one transaction may be generated by a file system driver associated with a host. Each transaction comprises logical block addresses (LBAs) and information associated with at least one function. The at least one transaction may be journaled into a computational storage for offloading data processing from the host to the computational storage. The computational storage comprises a persistent memory and at least one field-programmable gate array (FPGA) core. The offloading of the data processing comprises offloading journal replay operations to the computational storage. The journal replay operations comprise applying the at least one function to at least one subset of the LBAs by the at least one FPGA core.

20 Claims, 15 Drawing Sheets

OFFLOADING DATA PROCESSING INTO COMPUTATIONAL STORAGE USING JOURNALING

BACKGROUND

Companies and/or individuals, increasingly need to process a large quantity of data. Such data may come from a large quantity of data sources. However, the large quantity of available data and/or data sources may make it difficult for the companies and/or individuals to efficiently process the data. For example, data processing tasks may consume a large quantity of computing power and/or a large quantity of time. Improved techniques for data processing are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Modern computing paradigms and hardware stacks involve robust architectures that make the foundation of modern-day digital life. However, such paradigms are unable to provide a stable basis for growth of data processing performance. Big data and the growing volume of computing technology applications have exhausted the potential of the available computing paradigms. For example, a large percentage (i.e., about 80%) of machine instructions are generally operations for moving data. Thus, the majority of power consumption is spent not for computation but instead for data/instruction moving between the processing core and memory.

Figure 1:
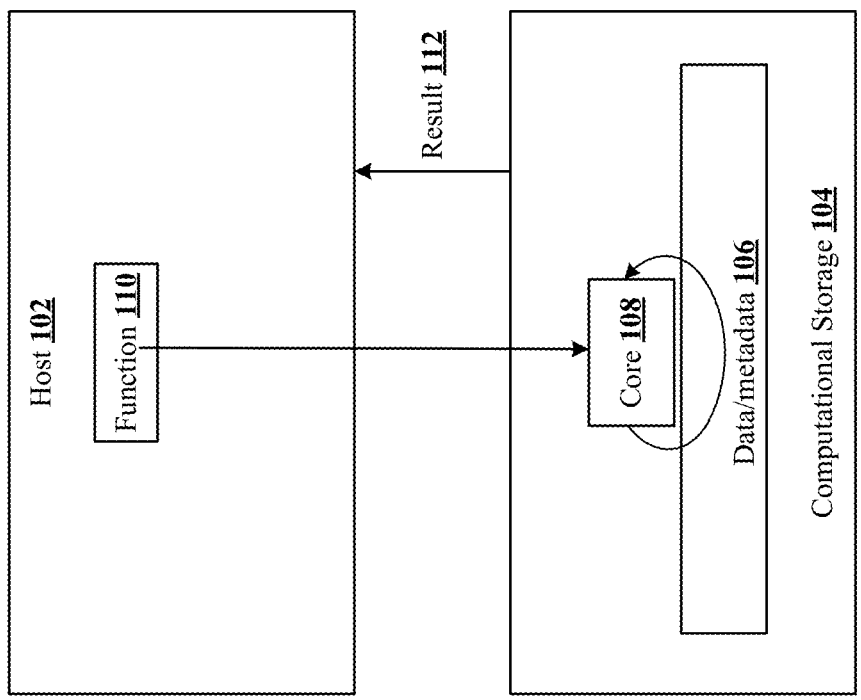
FIG. 1 illustrates an exemplary framework for offloading data processing into computational storage using journaling in accordance with the present disclosure.

FIG. 1 illustrates an exemplary framework 100 for offloading data processing into computational storage in accordance with the present disclosure. The framework 100 includes a host 102 and a computational storage 104. The host 102 may be a computing device. The host 102 may, for example, comprise an application. The host 102 may include a file system. The file system has knowledge about metadata and user data 106 that are stored in the storage device 104. Thus, the file system can initiate the offloading of metadata and user data 106 processing onto the computational storage side. The responsibility of file system is only to identify data or metadata (i.e., logical block address(es) (LBAs)) that needs to be processed, the type of data in these LBAs, and a function or algorithm 102 that needs to be applied or executed to these LBAs. The field programmable gate array (FPGA) core(s) 108 may apply the function or algorithm 102 to the content of LBAs. Finally, the file system simply needs to retrieve the result of the data processing on computational storage side at 112. This interaction between the file system and the computational storage 104 may be implemented using journaling, which is discussed in more detail below with regard to FIG. 2.

Figure 2:
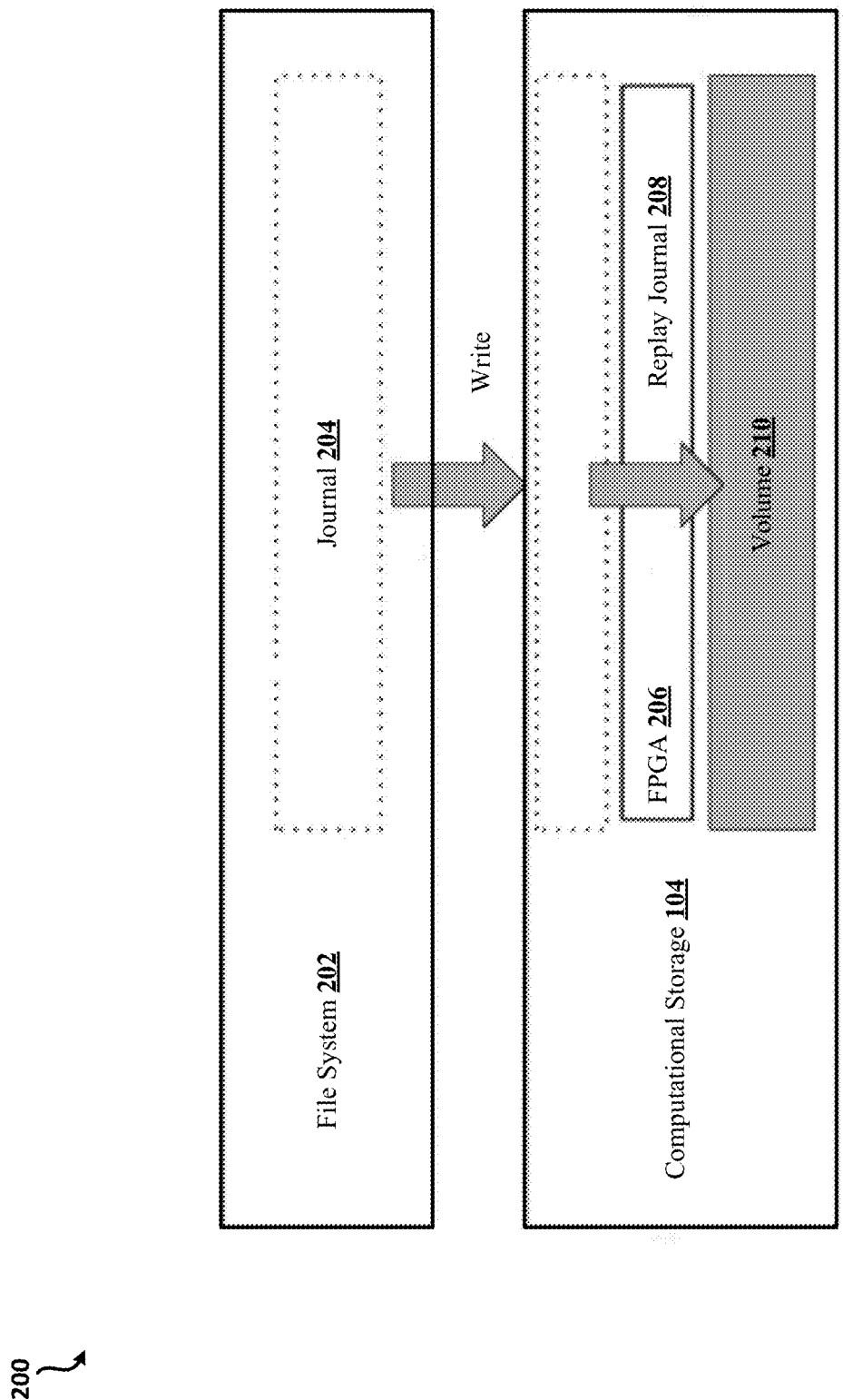
FIG. 2 illustrates an exemplary diagram depicting a journal-like write path mechanism in accordance with the present disclosure.

FIG. 2 illustrates an exemplary diagram 200 depicting a journal-like write path mechanism in accordance with the present disclosure. The host 102 discussed above with regard to FIG. 1 may be associated with a file system 202. The file system 202 includes (1) a file system volume that is created into partition of storage device and (2) a file system driver that is part of the operating system and keeps a copy of metadata and user data in the host's dynamic random access memory ("DRAM"). The file system 202 may include a journal 204 (i.e., the file system 202 may be a "journaling file system."). A journaling file system is a file system that keeps track of changes not yet committed to the file system's main part by recording the changes not yet committed to the file system's main part in a data structure known as a "journal", which is usually a circular log. In the event of a system crash or power failure, such file systems can be brought back online more quickly with a lower likelihood of becoming corrupted. Thus, a main goal of a journaling file system may be to increase the reliability of file system operations.

For example, the journal 204 may act as a circular buffer that is used to keep transactions. Each transaction may contain a modification of one or several LBAs on the file system volume 210 that creates, saves, and/or flushes a new state of the file system's metadata and user data (i.e., data/metadata 106). The journal may be stored only in persistent memory. Such memory may be in storage device. However, the preparation of transactions may take place in the host's DRAM before writing into the persistent memory. The journal is inside the storage device. The file system may need to read the transactions from the storage device into DRAM, and then it may replay the journal transaction (e.g., write new LBA(s) state into the persistent memory of the storage device). The journal 204 may protect the file system volume 210 from incorrect behavior or issues during file system's flush operation.

Journaling is a flash-friendly approach, in that there are no updates of the information in the journal because it represents the circular buffer. As a result, journaling is a good technique to prolong the lifetime of any persistent memory. As used herein, persistent storage or memory refers to any data storage device that retains data after power to that device is shut off. It is also sometimes referred to as non-volatile storage. Usually, journal thread is executed by the host. For example, the file system driver may traditionally store journal content, read journal content, apply transactions, and flush the modified LBAs. The journal replay logic can be offloaded into the computational storage 104. The journal replay operation has simple logic that can be easily implemented by FPGA core(s) 206 in the computational storage 104. As a result, the replay operation may be performed by computational storage 104 rather than the host. The host does not need to waste CPU resources on the replay operation. The offloading of the journal replay operation to the computational storage 104 means that the file system 202 needs only to store the journal content and the rest of the replay activity will happen inside of the computational storage 104.

Figure 3:
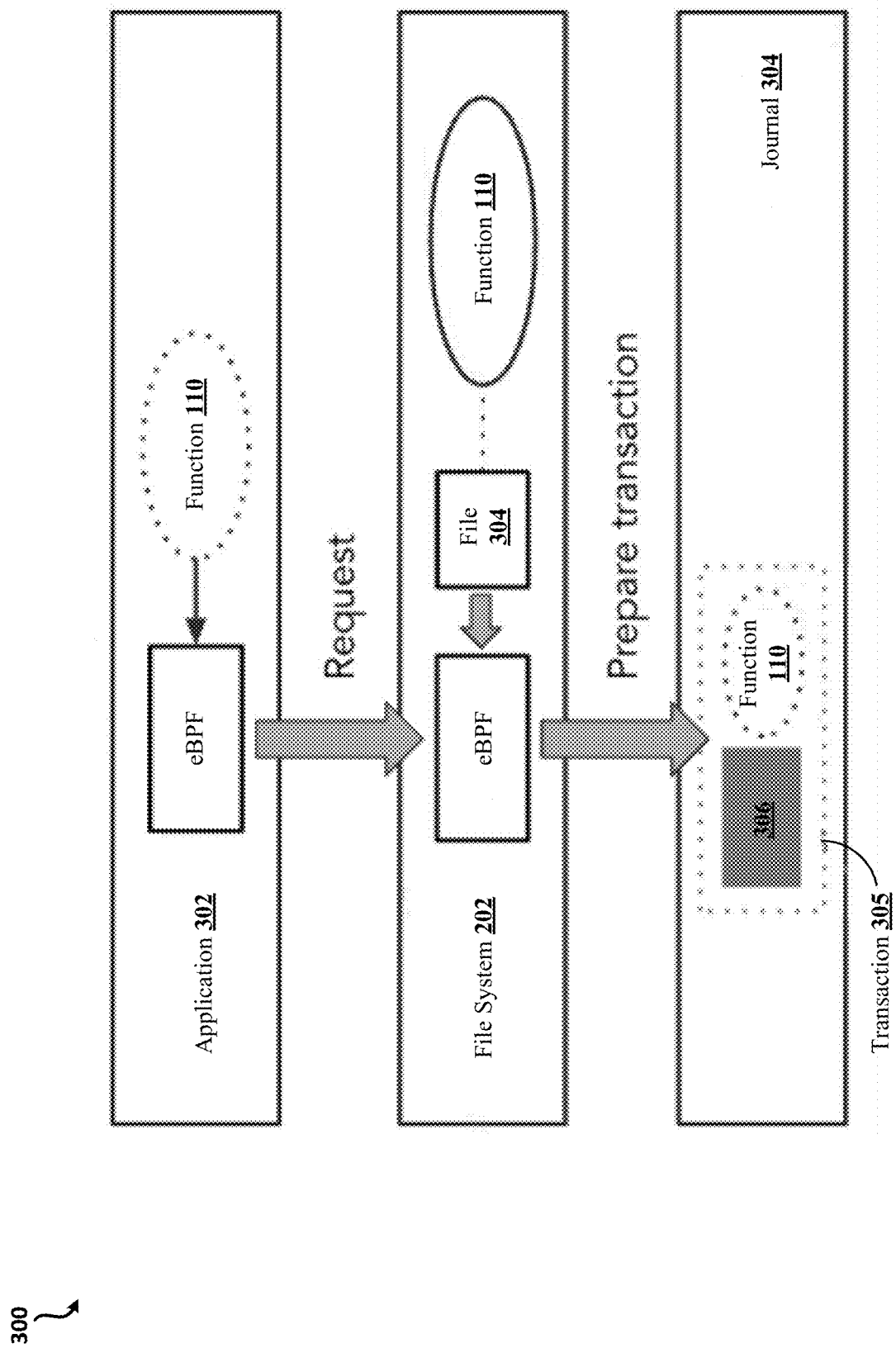
FIG. 3 illustrates an exemplary diagram depicting an extended Berkeley packet filter (eBPF) mechanism being used to facilitate the offloading of data processing into computational storage in accordance with the present disclosure.

In certain embodiments, an extended Berkeley packet filter (eBPF) mechanism may be utilized to deliver the function 110 (or executable code) into computational storage. FIG. 3 illustrates an exemplary diagram 300 depicting the eBPF mechanism employing a journal to offload computation into computational storage in accordance with the present disclosure. eBPF is a powerful technology with origins in the Linux kernel that can run sandboxed programs in an operating system kernel. It may be used to extend the capabilities of the kernel safely and efficiently without requiring any changes to be made to kernel source code or load kernel modules. As sandboxed programs are able to run within the operating system, application developers can run eBPF programs to add additional capabilities to the operating system at runtime. The operating system then guarantees safety and execution efficiency as if natively compiled with the aid of a Just-In-Time (JIT) compiler and verification engine. This has led to a wave of eBPF-based projects covering a wide array of use cases, including next-generation networking, observability, and security functionality.

The journal replay operation can be used as execution of offloaded computation. It can provide a powerful ecosystem for application developers to integrate the computational power of computational storage into the programming paradigm to achieve significant improvement of data processing performance. The eBPF mechanism may provide an easy-to-use programming paradigm to develop and to offload computation logic into storage space. Thus, computation logic may be delivered into storage in a cheaper and faster manner. The capability to offload data processing into storage space by means of eBPF provides the way to improve data processing approach with easy and flexible programming technique. For example, an application 302 can request the file system 202 to apply the execution of the function 110 on some file 304. As a result, the file system 202 can encapsulate the function execution request into a journal transaction 305 in the journal 304, for example. This transaction 305 can include the description 306 of LBAs. The description 306 of LBAs may indicate the file's placement inside of storage. The transaction 305 may additionally include executable code or script (i.e., function 110) that can be executed by computational storage. In certain embodiments, the write operation of the journal transaction 305 can work as request to execute the function during transaction replay.

Figure 4:
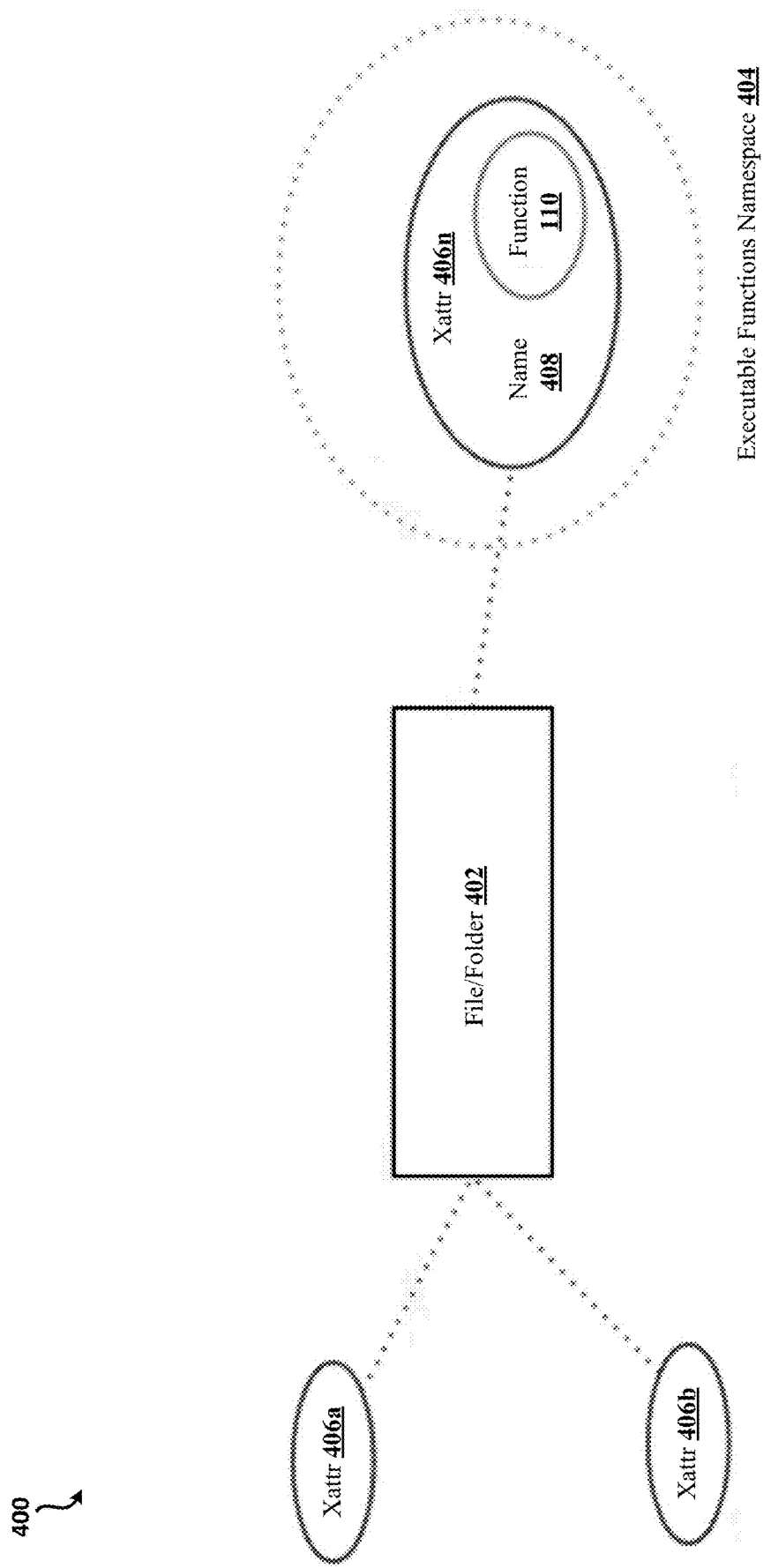
FIG. 4 illustrates an exemplary diagram depicting extended file attributes being used to facilitate the offloading of data processing into computational storage in accordance with the present disclosure.

Another possible way to deliver some function or executable code into computational storage can be as an extended attribute of a file and/or folder. FIG. 4 illustrates an exemplary diagram 400 depicting extended file attributes being used to facilitate the offloading of data processing into computational storage in accordance with the present disclosure. Extended file attributes are file system features that enable users to associate computer files with metadata not interpreted by the file system, whereas regular attributes have a purpose strictly defined by the file system (such as permissions or records of creation and modification times). Extended attributes are usually limited in size to a value significantly smaller than the maximum file size.

An extended attribute is a binary blob that is associated with a file/folder and can be accessed by name. As used herein, "xattr" refers to an extended attribute. For example, xattr 406*a-n* are binary blobs that are each associated with a file/folder 402 and can be accessed by name. For example, xattr 406*n* can be accessed by the name 408. The xattr 406*n* may be utilized to deliver the function 110 into computational storage. Generally speaking, it may be easy to associate some function(s) with a file or folder. However, the file system usually keeps the knowledge of extended attributes' locations in the storage space. Thus, the file system needs to share this knowledge with the storage device in some way. Journaling may be utilized to resolve this issue.

Figure 5:
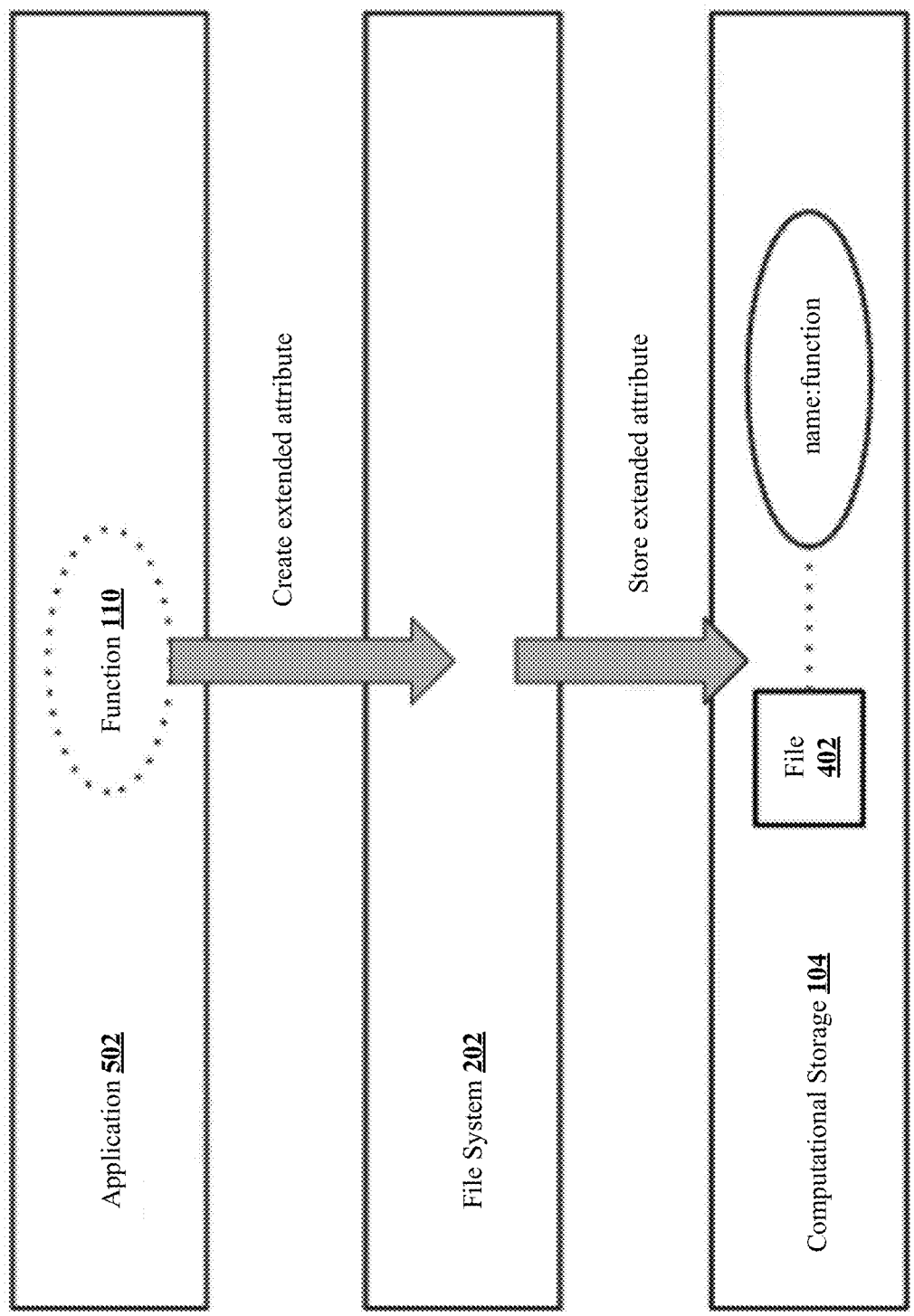
FIG. 5 illustrates an exemplary framework for storing a function as an extended attribute in accordance with the present disclosure.

FIG. 5 illustrates an exemplary framework 500 for creating and storing a function as an extended attribute in accordance with the present disclosure. An application 502 may need to offload some computation into computational storage 104. At first, this application can store the function 110 (or functions) by means of creation of one or several extended attributes of file. The knowledge of function location may be shared with the storage device in a variety of different ways. For example, the file system 202 can extract/read an extended attribute from the volume and store the function as part of journal transaction. In some embodiments, the file system 202 can provide an LBA that contains an extended attribute with a function. In other embodiments, the function can be identified based on identification (ID) information and then be converted into an LBA by the storage device. Alternatively, computational storage 104 can provide special persistent space to store such extended attributes. Generally speaking, the function 110 can be identified by ID and the journal transaction can keep this ID only to request the execution of such function. As a result, computational storage 104 can execute the function as part of replaying journal transactions.

In certain embodiments, the function execution can be the part of read/write input/output (I/O) request. For example, an application may try to update some LBA via an I/O request, and additional computation inside of computational storage may be a part of such I/O request. The additional computation may be, for example, checksum calculation, deduplication activity, delta-encoding, file system metadata operation, or even SQL request execution. One or more FPGA core(s) can take the journal transaction, execute the function, and store the result into a requested LBA.

Figure 6:
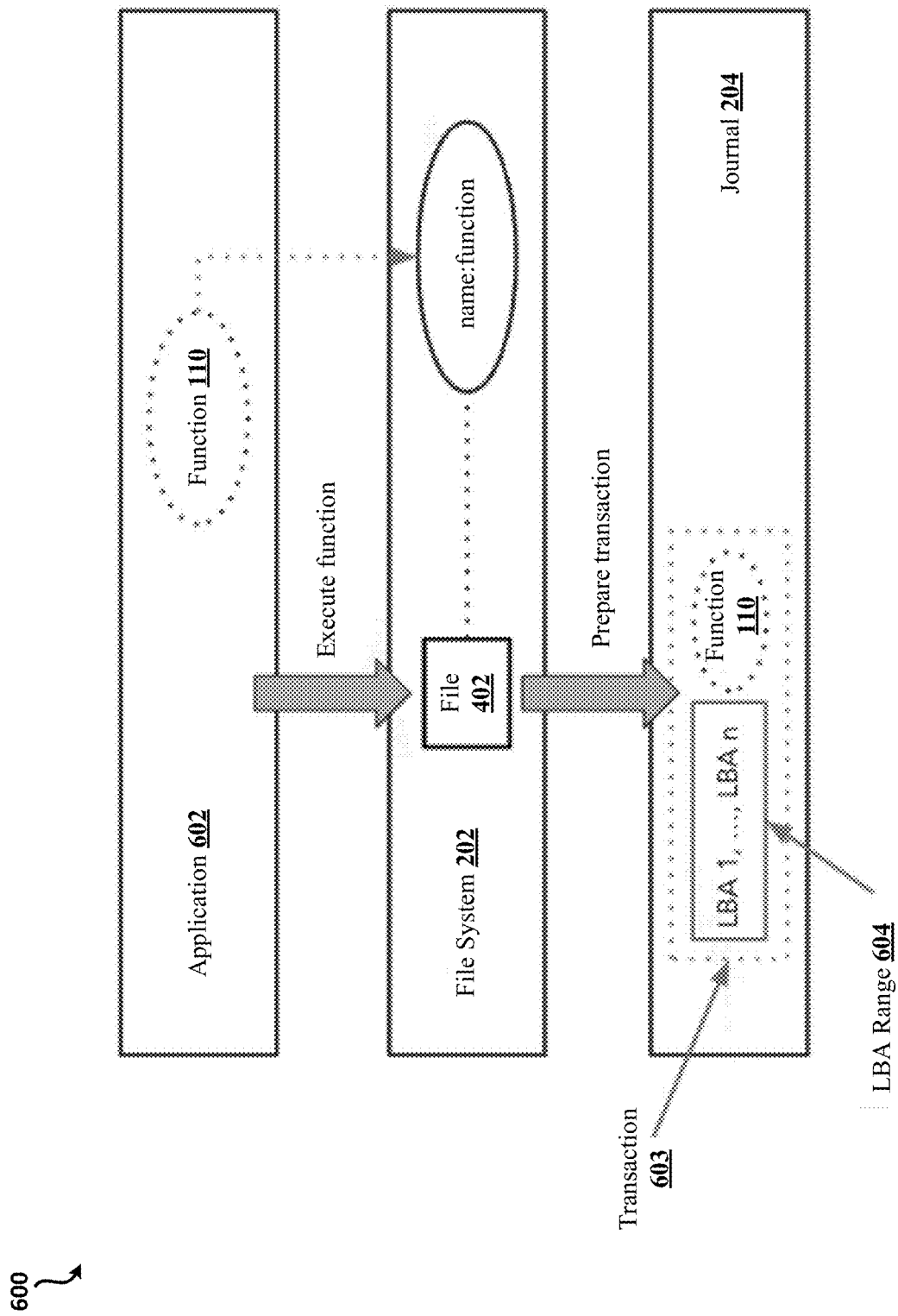
FIG. 6 illustrates another exemplary framework for offloading data processing into computational storage using journaling in accordance with the present disclosure

An application can request function execution inside a storage device by I/O request. In some examples, the I/O request may contain only code of operation. In other examples, the I/O request may contain code of operation and data payload. For example, an application can request function execution as a data processing request in some file by computational storage. FIG. 6 illustrates an exemplary framework 600 for initiating execution of the function 110 in accordance with the present disclosure. An application 602 can send a request for data processing to the file system 202. In response to receiving the request, the file system 202 may prepare one or several journal transactions 603. Every transaction 603 may contain a set or range of LBAs 604 and a function 110 (or function ID) to execute this computation. The function 110 can be represented by an extended attribute of a file, such as the file 402, or alternatively may instead be delivered through the eBPF mechanism. The operation of storing the transaction 603 into journal space may be a request to execute such computation by the storage device.

Figure 7:
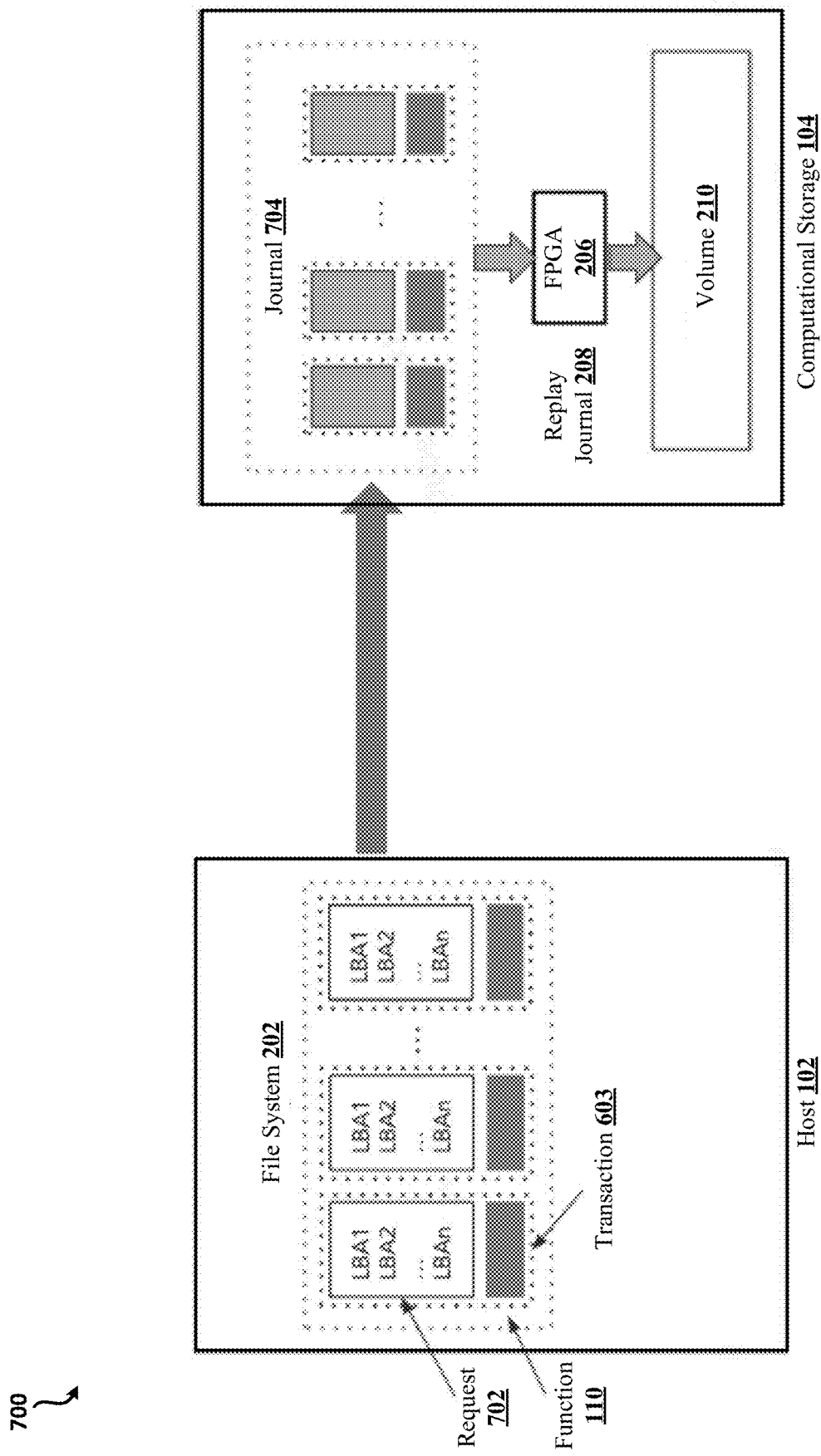
FIG. 7 illustrates an exemplary framework for initiating execution of a function in accordance with the present disclosure.

Data processing may be initiated. FIG. 7 illustrates an exemplary framework 700 for initiating data processing in accordance with the present disclosure. To initiate processing of the data in accordance with the request 702, the transaction(s) 603 are journaled into the computational storage 104 as journal 704 for offloading data processing from the host 102 to the computation storage 104. The journal 704 may protect the file system volume 210 from incorrect behavior or issues during file system's flush operation. The computational storage 104 may include replay journal logic 208 that can be easily implemented by FPGA core(s) 206. As described above, by offloading the journal replay logic 208 into the computational storage, host CPU resources do not need to be wasted on the replay operation. In particular, the offloading of the journal replay operation 208 means that the file system 202 only needs to store the journal content, and the rest activity will happen inside of computational storage 104. The FPGA core(s) 206 may extract LBA numbers from a metadata area of the transaction 603 and execute function 110 for every LBA number in the request 702. The result of such execution can be delivered on the host side as a result of read operation, can be stored into another set of LBA numbers, or can be stored as update of the requested set of LBA numbers.

Figure 8:
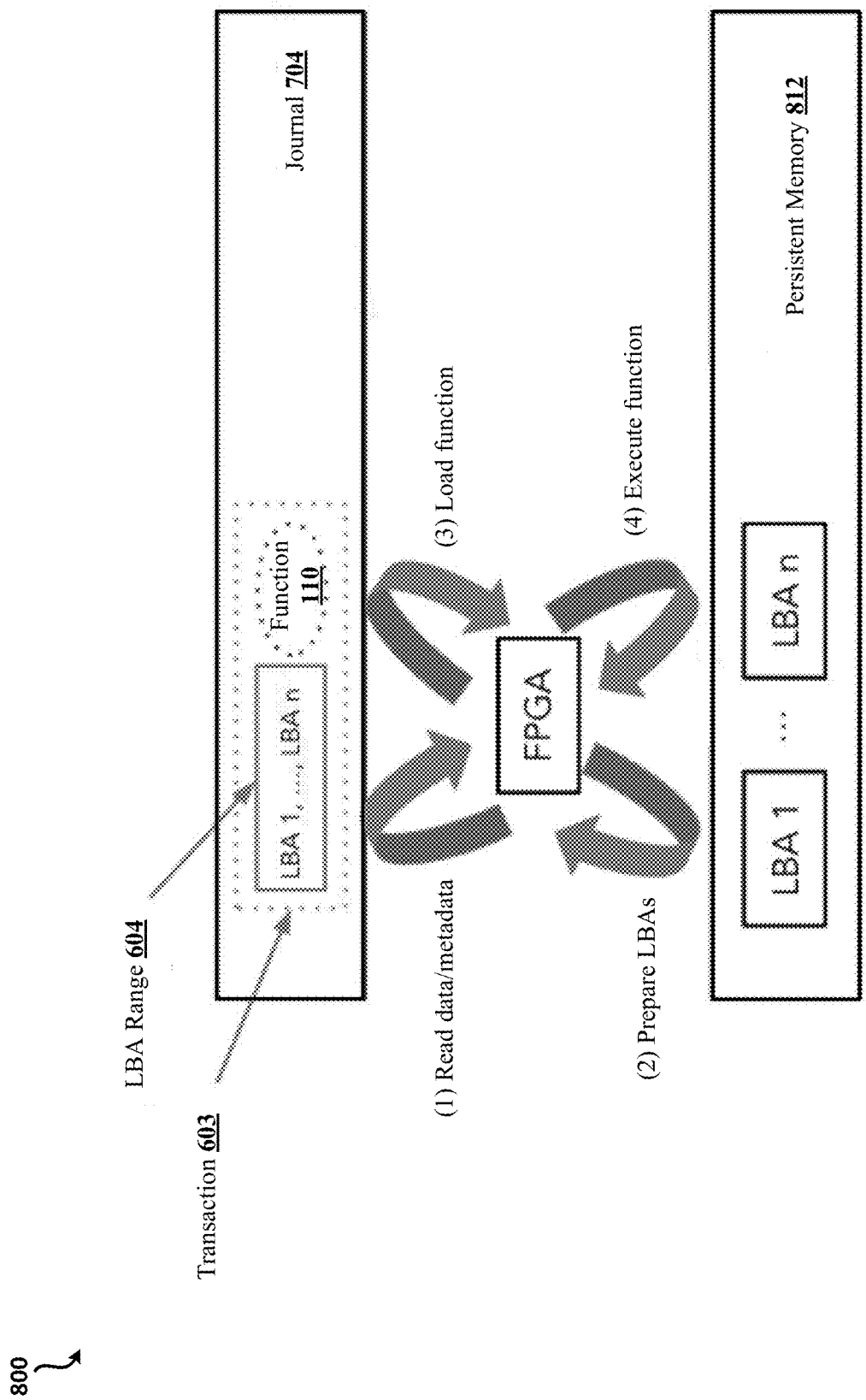
FIG. 8 illustrates an exemplary framework for initiating data processing in accordance with the present disclosure.

FIG. 8 illustrates an exemplary framework 800 for function execution in computational storage in accordance with the present disclosure. A memory pool may comprise a persistent memory 812 and at least one field-programmable gate array (FPGA) core. The logic of FPGA core(s) can be described in four steps. First, the FPGA core(s) may read metadata of the transaction 603 stored in the journal 704. Second, the FPGA core(s) may prepare and/or identify the LBAs under processing. For example, the FPGA core(s) may extract LBA numbers from a metadata area of the transaction 603. Third, the FPGA core(s) may identify (i.e., load, compile, etc.) the executable function 110. Fourth, the FPGA core(s) may execute the function 110 for every LBA number in the request and deliver or store the result of operation. For example, the result of such execution can be delivered on the host side as a result of read operation, can be stored into another set of LBA numbers, or can be stored as update of the requested set of LBA numbers.

Figure 9:
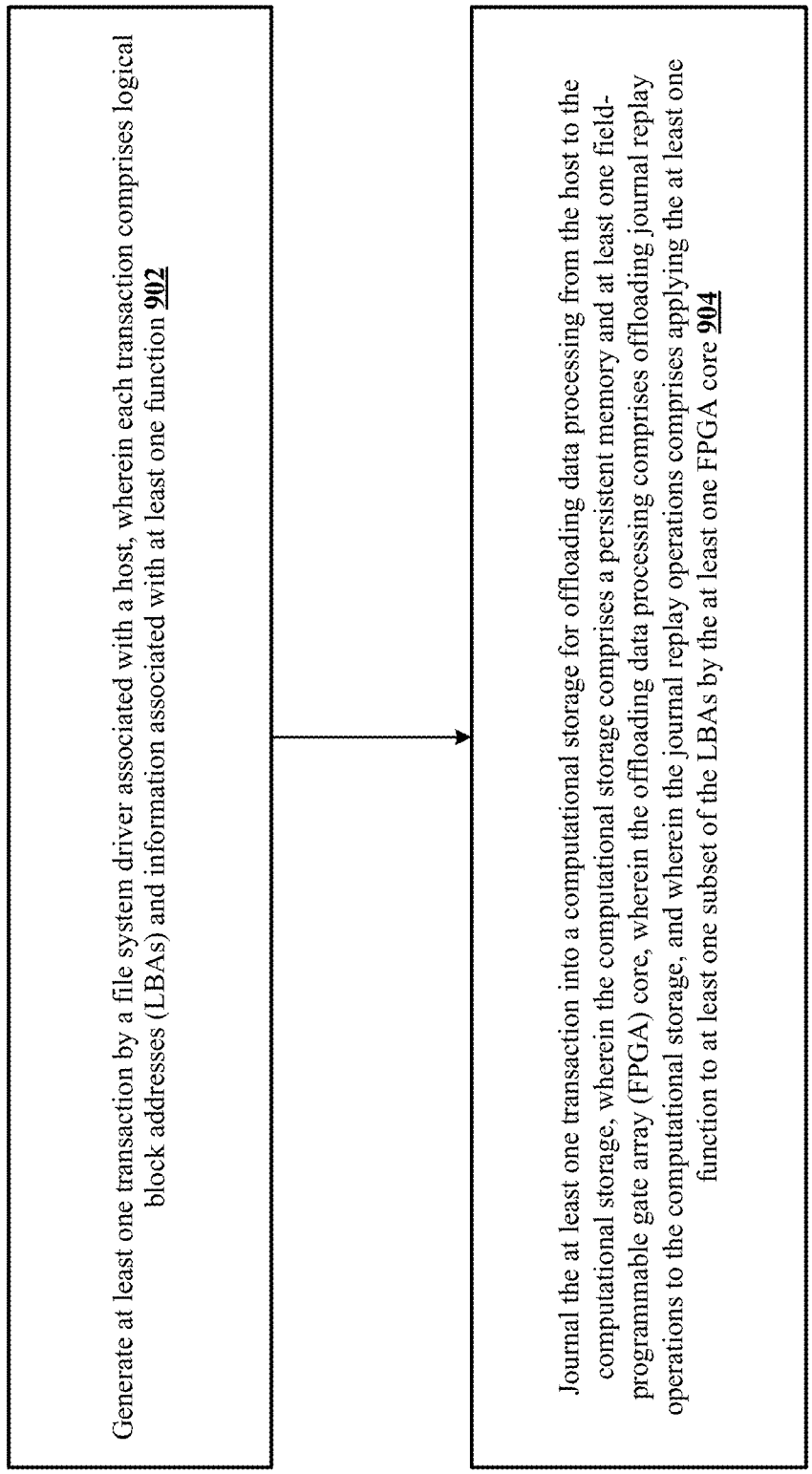
FIG. 9 illustrates an example process for offloading data processing into computational storage using journaling in accordance with the present disclosure.

FIG. 9 illustrates an example process 900. The process 900 may be performed, at least in part, by a framework for offloading data processing into computational storage. The process 900 may be performed to offload data processing into computational storage using journaling. Although depicted as a sequence of operations in FIG. 9, those of ordinary skill in the art will appreciate that various embodiments may add, remove, reorder, or modify the depicted operations.

A framework may include a host and a computational storage. The host may include a file system driver. The file system has knowledge about metadata and user data that are stored in the computational storage. Thus, the file system can initiate the offloading of metadata and user data processing onto the computational storage side. The responsibility of file system is only to identify data or metadata (i.e., LBAs) that need to be processed, the type of data in these LBAs, and a function or algorithm that needs to be applied or executed to these LBAs.

At 902, at least one transaction may be generated by a file system driver associated with a host. Each transaction comprises LBAs and information associated with at least one function. In embodiments, generating the at least one transaction by the file system comprises receiving a request for executing the at least one function from an application. In response to receiving the request for executing the at least one function, the file system driver may encapsulate the request into the at least one transaction. The at least one transaction may comprise executable code(s) or script(s) associated with the at least one function, and the executable code(s) or script(s) are configured to be executed by FPGA logic.

The function can be represented by an extended attribute of a file or alternatively may instead be delivered through the eBPF mechanism. If the function is represented by an extended attribute, the extended attribute with function code may be created by a setxattr request before any transaction. As a result, the file system driver needs to identify a location of the extended attribute by LBA or some ID that the storage device can recognize.

At 904, the at least one transaction may be journaled into a persistent memory for offloading data processing from the host to the computational storage (i.e., computational storage device). The computational storage may comprise a persistent memory and at least one FPGA core. Offloading data processing may comprise offloading journal replay operations to the computational storage. The journal replay operations may comprise applying the at least one function to at least one subset of the LBAs by the at least one FPGA core. Finally, the file system simply needs to retrieve the result of the data processing on computational storage side.

Figure 10:
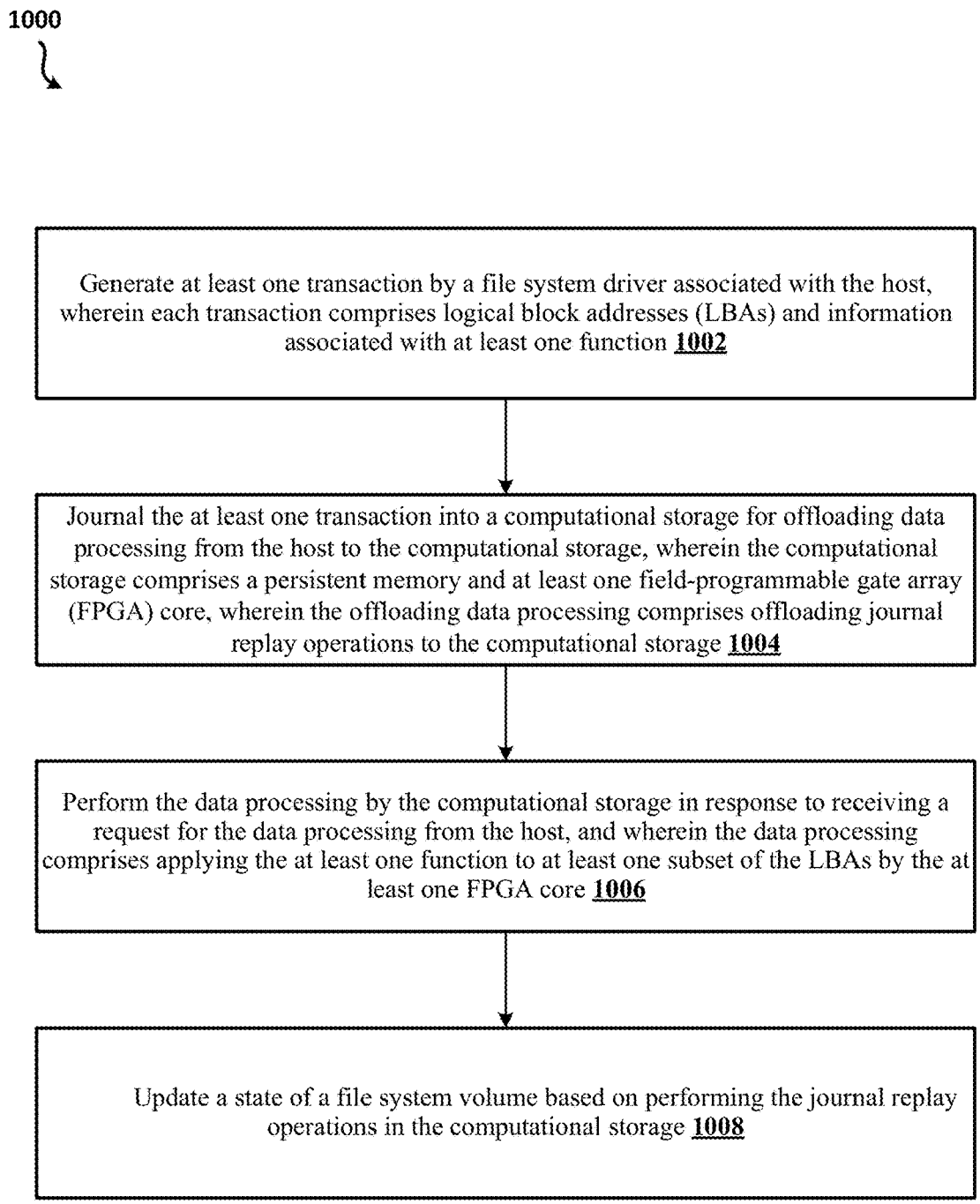
FIG. 10 illustrates another example process for offloading data processing into computational storage using journaling in accordance with the present disclosure.

FIG. 10 illustrates an example process 1000. The process 1000 may be performed, at least in part, by a framework for offloading data processing into computational storage. The process 1000 may be performed to offload data processing into computational storage using journaling. Although depicted as a sequence of operations in FIG. 10, those of ordinary skill in the art will appreciate that various embodiments may add, remove, reorder, or modify the depicted operations.

A framework may include a host and a computational storage. The host may include a file system driver. The file system has knowledge about metadata and user data that are stored in the computational storage. Thus, the file system can initiate the offloading of metadata and user data processing onto the computational storage side. The responsibility of file system is only to identify data or metadata (i.e., LBAs)

that need to be processed, the type of data in these LBAs, and a function or algorithm that needs to be applied or executed to these LBAs.

As described above, an application can request the file system to apply the execution of the function on some file. At 1002, at least one transaction may be generated by the file system driver. Each transaction may comprise LBAs and information associated with at least one function. The at least one transaction may comprise executable code(s) or script(s) associated with the at least one function, and the executable code(s) or script(s) are configured to be executed by a computational storage.

The function can be represented by an extended attribute of a file or alternatively may instead be delivered through the eBPF mechanism. If the function is represented by an extended attribute of a file, the extended attribute with function code may be created by a setxattr request before any transaction. Thus, the file system driver needs to identify a location of the extended attribute by LBA or some ID that the storage device can recognize. The extended attribute with function code may be stored in the persistent memory of the computational storage device. Therefore, there is no need of sending function code as part of a transaction. At 1004, the at least one transaction may be journaled into a computational storage for offloading data processing from the host to the computational storage. The computational storage may comprise a persistent memory and at least one FPGA core. Offloading data processing may comprise offloading journal replay operations to the computational storage. At 1006, the data processing may be performed by the computational storage in response to receiving the request for the data processing from the host. The data processing may comprise applying the at least one function to at least one subset of the LBAs by the at least one FPGA core. The result of such execution can be delivered on the host side as a result of read operation, can be stored into another set of LBA numbers, or can be stored as update of the requested set of LBA numbers. At 1008, a state of the file system may be updated based on performing the journal replay operations in the memory pool.

Figure 11:
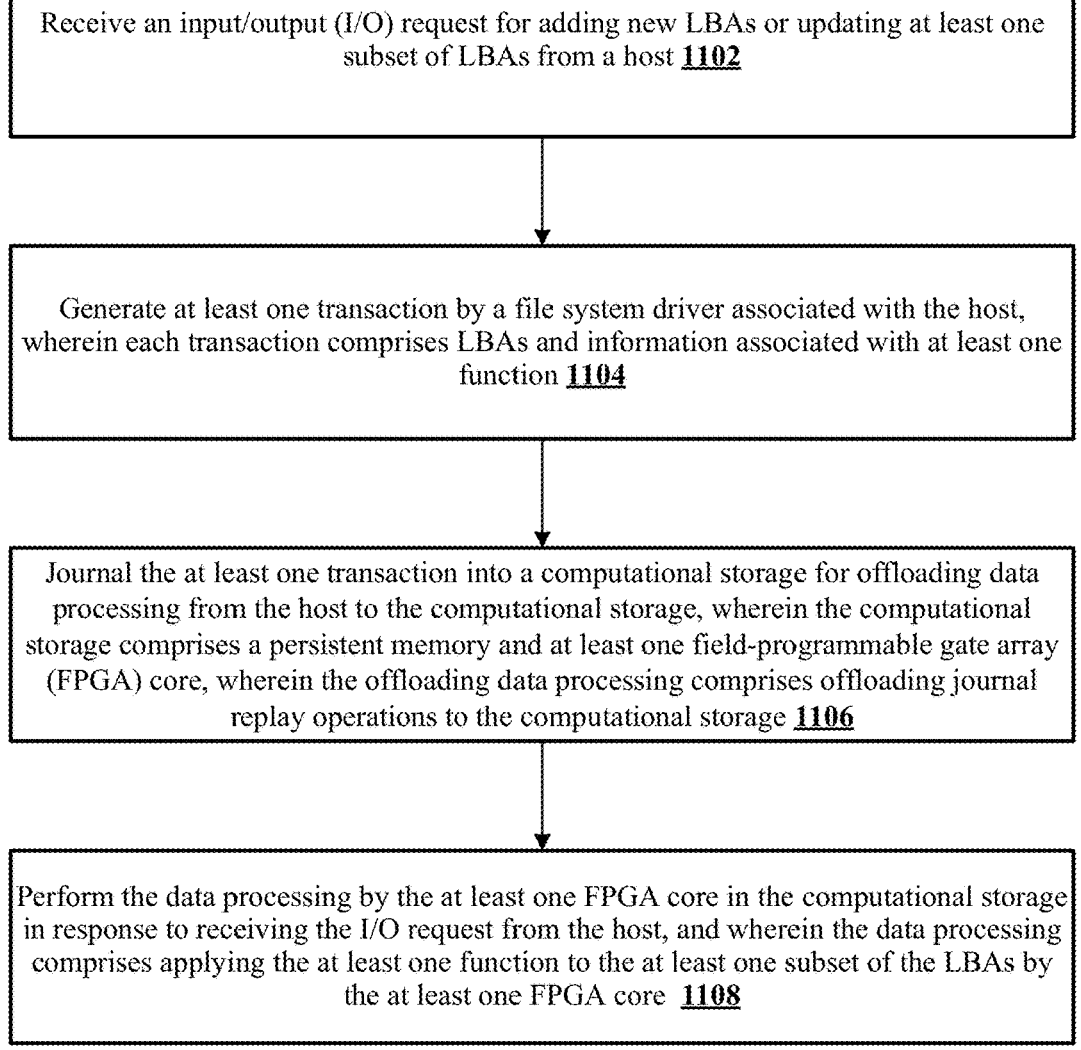
FIG. 11 illustrates another example process for offloading data processing into computational storage using journaling in accordance with the present disclosure.

FIG. 11 illustrates an example process 1100. The process 1100 may be performed, at least in part, by a framework for offloading data processing into computational storage. The process 1100 may be performed to offload data processing into computational storage using journaling. Although depicted as a sequence of operations in FIG. 11, those of ordinary skill in the art will appreciate that various embodiments may add, remove, reorder, or modify the depicted operations.

As described above, function execution can be the part of an read/write input/output (I/O) request. For example, an application may try to update some LBA via an I/O request, and additional computation inside of computational storage may be a part of such I/O request. The additional computation may be, for example, checksum calculation, deduplication activity, delta-encoding, file system metadata operation, or even SQL request execution. One or more FPGA core(s) can take the journal transaction, execute the function, and store the result into a requested LBA. At 1102, an input/output (I/O) request for adding new LBAs or updating at least one subset of LBAs may be received from a host 1102.

At 1104, at least one transaction may be generated by the file system driver. Each transaction may comprise LBAs and information associated with at least one function. The at least one transaction may comprise executable code(s) or script(s) associated with the at least one function, and the executable code(s) or script(s) are configured to be executed by a computational storage.

The function can be represented by an extended attribute of a file or alternatively may instead be delivered through the eBPF mechanism. If the function is represented by an extended attribute of a file, the extended attribute containing function code may be created by a setxattr request before any transaction. Thus, the file system driver needs to identify a location of the extended attribute by LBA or some ID that the storage device can recognize. The extended attribute containing function code may be stored in the persistent memory of the storage device. Thus, there is no need of sending function code as part of a transaction. At 1106, the at least one transaction may be journaled into a computational storage for offloading data processing from the host to the computational storage. The computational storage may comprise a persistent memory and at least one FPGA core. Offloading data processing may comprise offloading journal replay operations to the computational storage.

At 1108, the data processing may be performed the at least one FPGA core in the computational storage in response to receiving the I/O request from the host. The data processing may comprise applying the at least one function to at least one subset of the LBAs by the at least one FPGA core. The result of such execution can be delivered on the host side as a result of read operation, can be stored into another set of LBA numbers, or can be stored as update of the requested set of LBA numbers.

Figure 12:
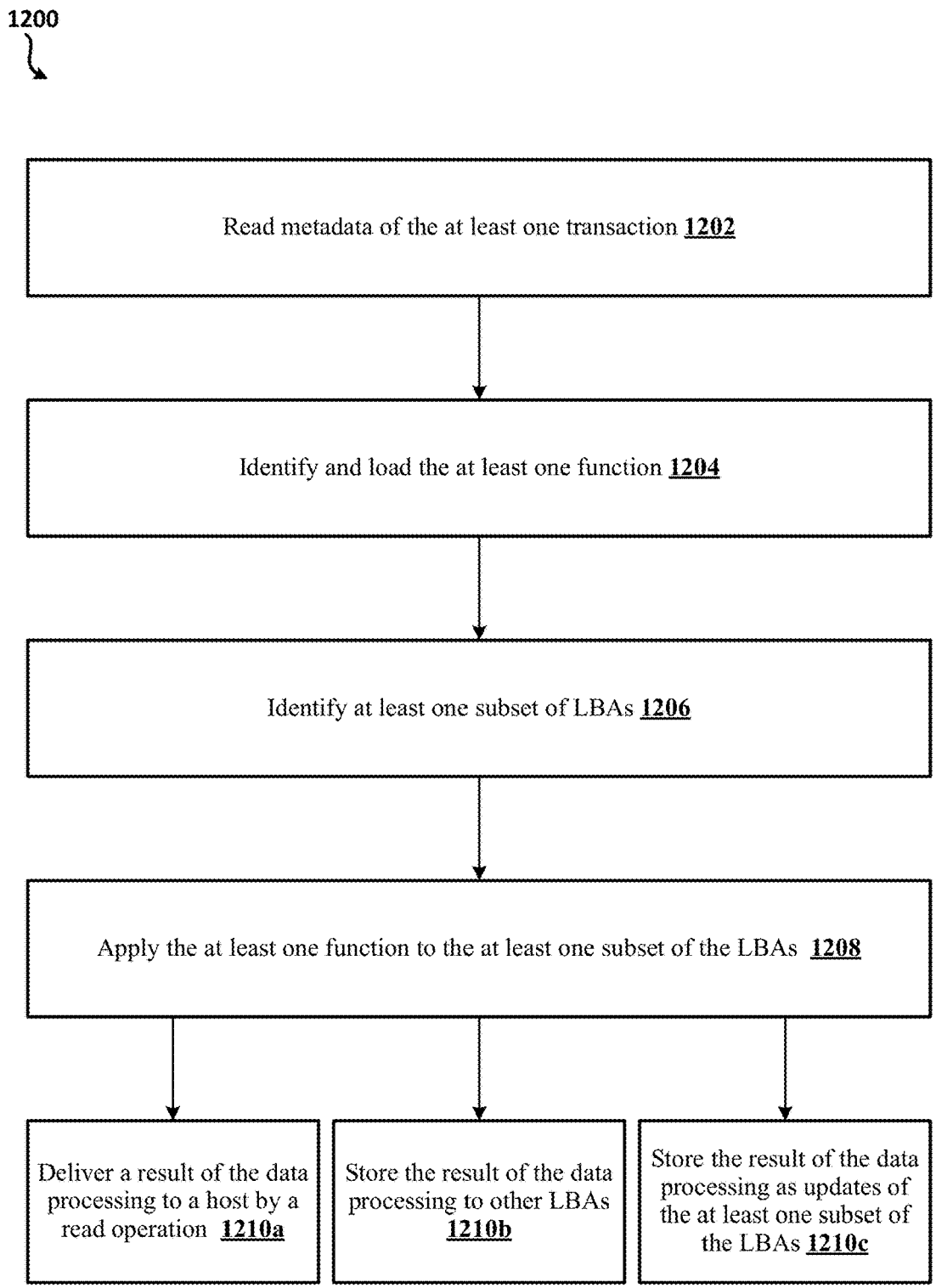
FIG. 12 illustrates another example process for offloading data processing into computational storage using journaling in accordance with the present disclosure.

FIG. 12 illustrates an example process 1200. The process 1200 may be performed, at least in part, by one or more FPGA cores. The process 1200 may be performed to offload data processing into computational storage using journaling. Although depicted as a sequence of operations in FIG. 12, those of ordinary skill in the art will appreciate that various embodiments may add, remove, reorder, or modify the depicted operations.

As described above, the file system driver has knowledge about metadata and user data that are stored in computational storage. Thus, the file system can initiate the offloading of metadata and user data processing onto the computational storage side. The responsibility of the file system is only to identify data or metadata (i.e., logical block address(es) (LBAs)) that needs to be processed, the type of data in these LBAs, and a function or algorithm 410 that needs to be applied or executed to these LBAs. The FPGA core(s) may apply the function or algorithm to the LBAs. At 1202, the FPGA core(s) may read metadata of at least one transaction. The transaction may be stored in a journal by a host. At 1204, the FPGA core(s) may identify and load the at least one function. For example, the FPGA core(s) may compile the executable function. At 1206, the FPGA core(s) may identify at least one subset of LBAs to be processed. For example, the FPGA core(s) may prepare and/or identify the LBAs under processing by extracting LBA numbers from a metadata area of the transaction. At 1208, the FPGA core(s) may apply the at least one function to the at least one subset of the LBAs. For example, the FPGA core(s) may execute the function for every LBA number in the request.

Finally, the FPGA core(s) may deliver or store the result of operation. For example, the method 1200 may proceed to 1210*a*. At 1210*a*, a result of the data processing may be delivered to a host by a read operation. The method may additionally, or alternatively, proceed to 1210*b*. At 1210*b*, the result of the data processing may be stored to other LBAs. The method may additionally, or alternatively, proceed to 1210*c*. At 1210*c*, the result of the data processing may be stored as updates of the at least one subset of the LBAs.

Figure 13:
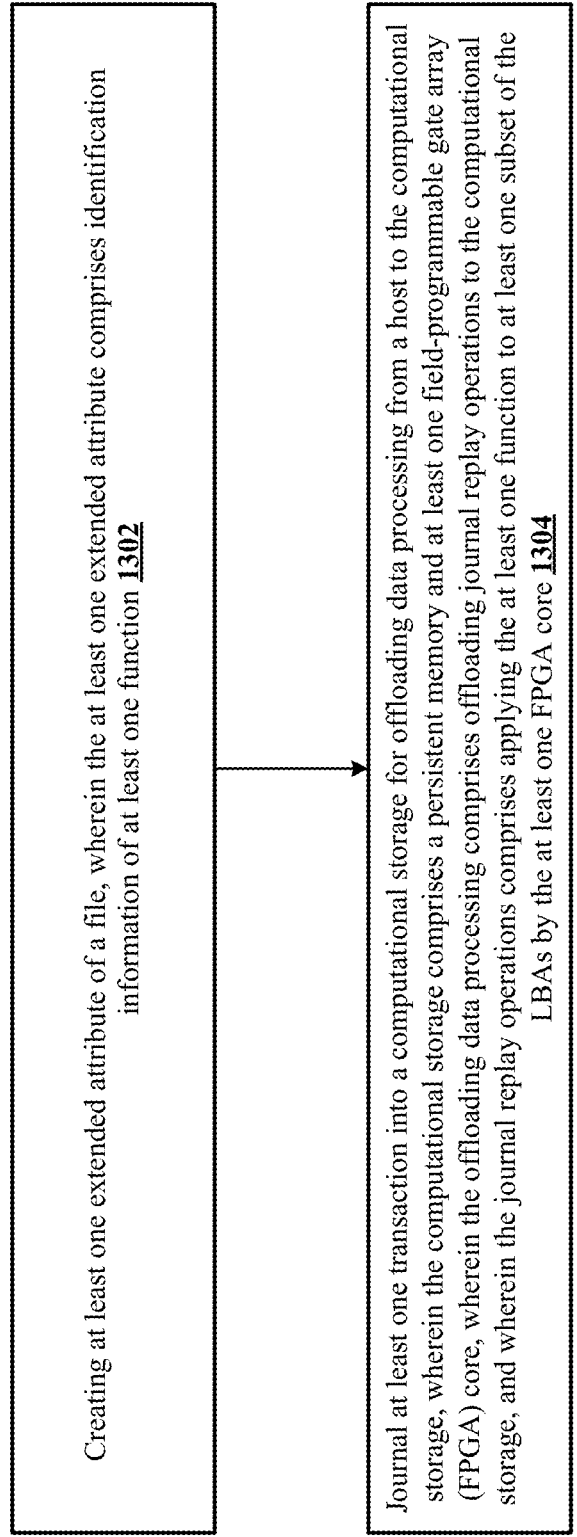
FIG. 13 illustrates another example process for offloading data processing into computational storage using journaling in accordance with the present disclosure.

FIG. 13 illustrates an example process 1300. The process 1300 may be performed, at least in part, by a framework for offloading data processing into computational storage. The process 1300 may be performed to offload data processing into computational storage using journaling. Although depicted as a sequence of operations in FIG. 13, those of ordinary skill in the art will appreciate that various embodiments may add, remove, reorder, or modify the depicted operations.

As described above, a way to deliver some function or executable code into computational storage can be as an extended attribute of a file and/or folder. Extended file attributes are file system features that enable users to associate computer files with metadata not interpreted by the file system, whereas regular attributes have a purpose strictly defined by the file system (such as permissions or records of creation and modification times). Extended attributes are usually limited in size to a value significantly smaller than the maximum file size. At 1302, at least one extended attribute of a file or folder may be created. The at least one extended attribute comprises identification information of at least one function. The at least one extended attribute may comprise the code associated with the function. For example, the at least one extended attribute may be a binary blob that is associated with a file/folder and can be accessed by name.

The at least one extended attribute may be utilized to deliver the function into computational storage. The at least one extended attribute may be stored into a persistent memory. The knowledge of the function location may be shared with the computational storage in a variety of different ways. For example, the file system can extract/read the at least one extended attribute from the volume and store the function as part of a journal transaction. Alternatively, the computational storage can provide special persistent space to store such extended attributes. Generally speaking, the function can be identified by ID and the journal transaction can keep this only to request the execution of such function. As a result, computational storage can execute the function as part of replaying journal transactions.

At 1304, the at least one transaction may be journaled into a computational storage for offloading data processing from the host to the computational storage. The at least one transaction may comprise LBAs and information associated with the at least one function. The computational storage may comprise a persistent memory and at least one FPGA core. Offloading data processing may comprise offloading journal replay operations to the computational storage. The journal replay operations may comprise applying the at least one function to at least one subset of the LBAs by the at least one FPGA core.

Figure 14:
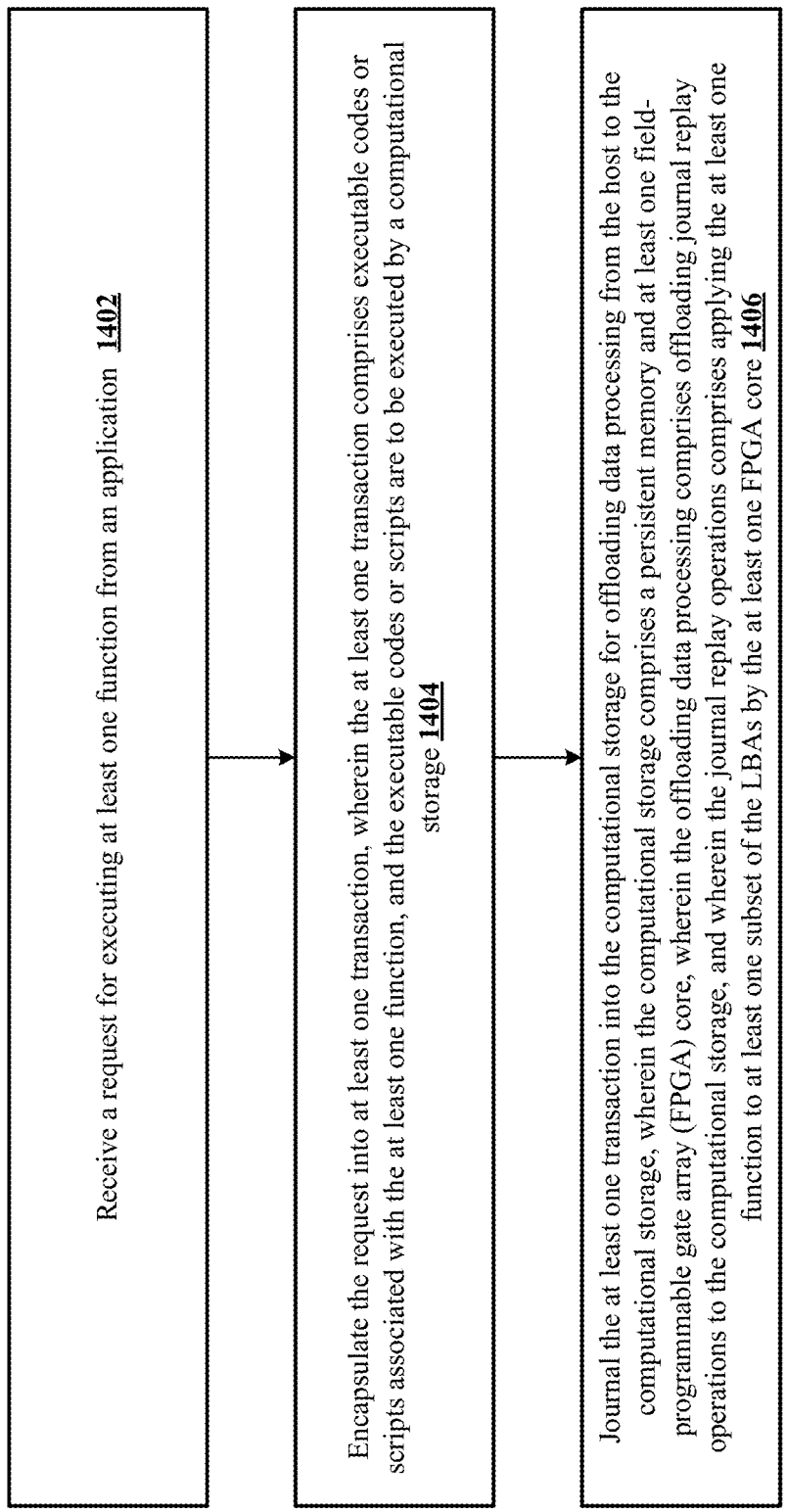
FIG. 14 illustrates another example process for offloading data processing into computational storage using journaling in accordance with the present disclosure.

FIG. 14 illustrates an example process 1400. The process 1400 may be performed, at least in part, by a framework for offloading data processing into computational storage. The process 1400 may be performed to offload data processing into computational storage using journaling. Although depicted as a sequence of operations in FIG. 14, those of ordinary skill in the art will appreciate that various embodiments may add, remove, reorder, or modify the depicted operations.

At 1402, a request for executing at least one function may be received from a host or an application. For example, an application can request a file system to apply the execution of the function on some file. At 1404, the request may be encapsulated into at least one transaction. The at least one transaction comprises executable code(s) or script(s) associated with the at least one function, and the executable code(s) or script(s) are to be executed by a computational storage. The at least one transaction may comprise a description of LBAs. The description of LBAs may indicate the file's placement inside of the memory pool. The at least one transaction may comprise executable code(s) or script(s) (i.e., a function) that can be executed by a computational storage.

At 1406, at least one transaction may be journaled into a computational storage for offloading data processing from the host to the computational storage. The computational storage may comprise a persistent memory and at least one FPGA core. In certain embodiments, the write operation of the journal transaction can work as request to execute the function during transaction replay. Offloading data processing may comprise offloading journal replay operations to the computational storage. The journal replay operations may comprise applying the at least one function to at least one subset of the LBAs by the at least one FPGA core.

Figure 15:
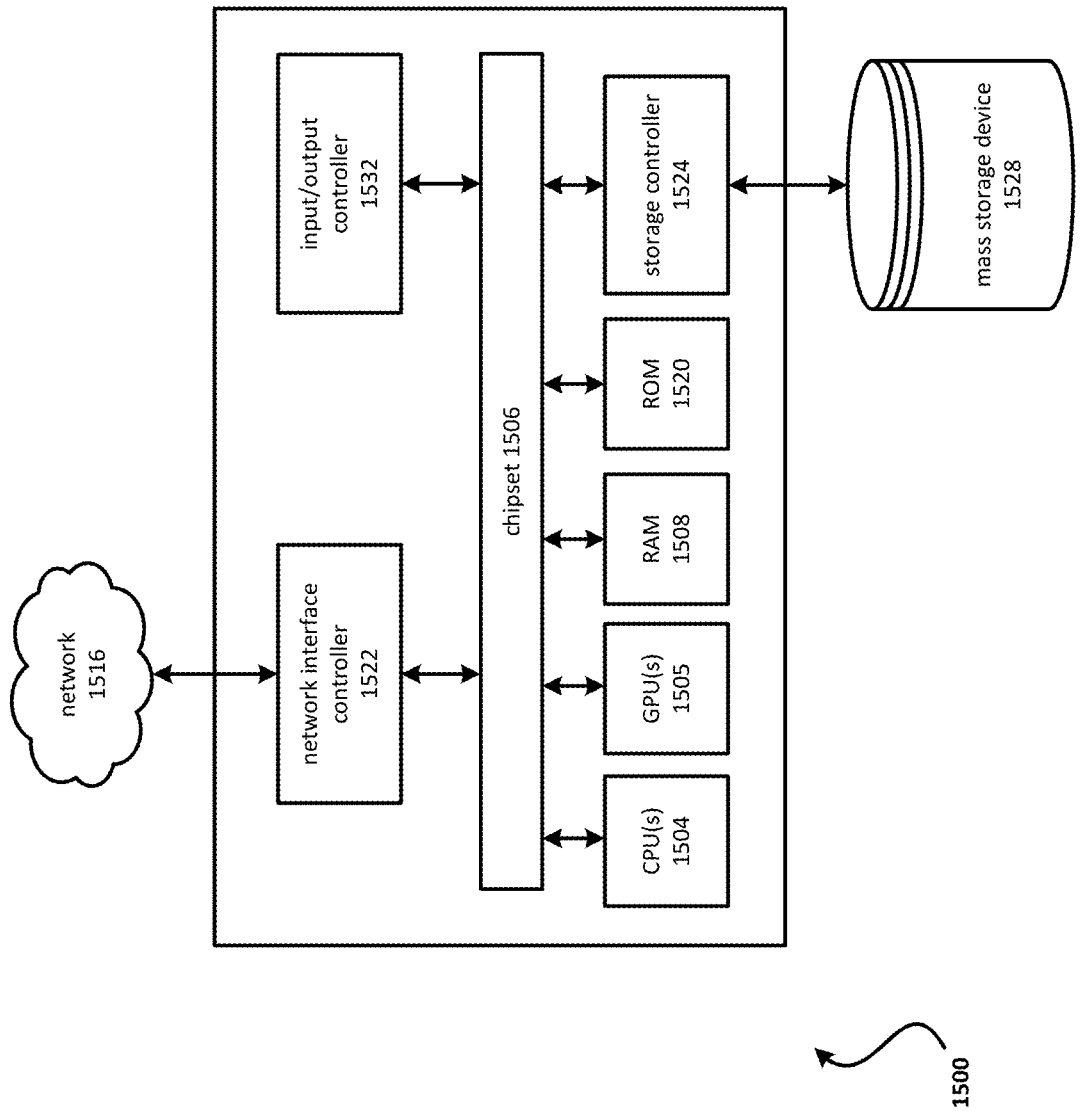
FIG. 15 illustrates an example computing device which may be used to perform any of the techniques disclosed herein.

FIG. 15 illustrates a computing device that may be used in various aspects, such as the services, networks, modules, and/or devices depicted in FIGS. 1-8. The computer architecture shown in FIG. 15 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1500 may include a baseboard, or "motherboard," which is a printed circuit board to which a multitude of components or devices may be connected by way of a system bus or other electrical communication paths. One or more central processing units (CPUs) 1504 may operate in conjunction with a chipset 1506. The CPU(s) 1504 may be standard programmable processors that perform arithmetic and logical operations necessary for the operation of the computing device 1500.

The CPU(s) 1504 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1504 may be augmented with or replaced by other processing units, such as GPU(s) 1505. The GPU(s) 1505 may comprise processing units specialized for but not necessarily limited to highly parallel computations, such as graphics and other visualization-related processing.

A chipset 1506 may provide an interface between the CPU(s) 1504 and the remainder of the components and devices on the baseboard. The chipset 1506 may provide an interface to a random-access memory (RAM) 1508 used as the main memory in the computing device 1500. The chipset 1506 may further provide an interface to a computer-readable storage medium, such as a read-only memory (ROM) 1520 or non-volatile RAM (NVRAM) (not shown), for storing basic routines that may help to start up the computing device 1500 and to transfer information between the various components and devices. ROM 1520 or NVRAM may also store other software components necessary for the operation of the computing device 1500 in accordance with the aspects described herein.

The computing device 1500 may operate in a networked environment using logical connections to remote computing nodes and computer systems through local area network (LAN). The chipset 1506 may include functionality for providing network connectivity through a network interface controller (NIC) 1522, such as a gigabit Ethernet adapter. A NIC 1522 may be capable of connecting the computing device 1500 to other computing nodes over a network 1516. It should be appreciated that multiple NICs 1522 may be present in the computing device 1500, connecting the computing device to other types of networks and remote computer systems.

The computing device 1500 may be connected to a mass storage device 1528 that provides non-volatile storage for the computer. The mass storage device 1528 may store system programs, application programs, other program modules, and data, which have been described in greater detail herein. The mass storage device 1528 may be connected to the computing device 1500 through a storage controller 1524 connected to the chipset 1506. The mass storage device 1528 may consist of one or more physical storage units. The mass storage device 1528 may comprise a management component 1515. A storage controller 1524 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1500 may store data on the mass storage device 1528 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1528 is characterized as primary or secondary storage and the like.

For example, the computing device 1500 may store information to the mass storage device 1528 by issuing instructions through a storage controller 1524 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1500 may further read information from the mass storage device 1528 by detecting the physical states or characteristics of one or more particular locations within the physical storage units.

In addition to the mass storage device 1528 described above, the computing device 1500 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1500.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1528 depicted in FIG. 15, may store an operating system utilized to control the operation of the computing device 1500. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1528 may store other system or application programs and data utilized by the computing device 1500.

The mass storage device 1528 or other computer-readable storage media may also be encoded with computer-executable instructions, which, when loaded into the computing device 1500, transforms the computing device from a general-purpose computing system into a special-purpose computer capable of implementing the aspects described herein. These computer-executable instructions transform the computing device 1500 by specifying how the CPU(s) 1504 transition between states, as described above. The computing device 1500 may have access to computer-readable storage media storing computer-executable instructions, which, when executed by the computing device 1500, may perform the methods described herein.

A computing device, such as the computing device 1500 depicted in FIG. 15, may also include an input/output controller 1532 for receiving and processing input from a number of input devices, such as a keyboard, a mouse, a touchpad, a touch screen, an electronic stylus, or other type of input device. Similarly, an input/output controller 1532 may provide output to a display, such as a computer monitor, a flat-panel display, a digital projector, a printer, a plotter, or other type of output device. It will be appreciated that the computing device 1500 may not include all of the components shown in FIG. 15, may include other components that are not explicitly shown in FIG. 15, or may utilize an architecture completely different than that shown in FIG. 15.

As described herein, a computing device may be a physical computing device, such as the computing device 1500 of FIG. 15. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate.

For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc.

Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method comprising:
   generating at least one transaction by a file system driver associated with a host, wherein the at least one transaction comprises logical block addresses (LBAs) and information associated with at least one function; and
   journaling the at least one transaction into a computational storage for offloading data processing from the host to the computational storage, wherein the computational storage comprises a persistent memory and at least one field-programmable gate array (FPGA) core, wherein the offloading of the data processing comprises offloading journal replay operations to the computational storage, wherein the journal replay operations comprise applying the at least one function to at least one subset of the LBAs by the at least one FPGA core based on the at least one transaction in the computational storage, and wherein the at least one transaction in the computational storage comprises codes or scripts associated with the at least one function and executable by the computational storage.

2. The method of claim 1, wherein the generating at least one transaction by a file system driver comprises:
   receiving a request for executing the at least one function; and
   encapsulating the request into the at least one transaction, wherein the at least one transaction comprises the codes or scripts associated with the at least one function, and the codes or scripts are to be executed by the computational storage.

3. The method of claim 1, further comprising:
   creating at least one extended attribute of a file, wherein the at least one extended attribute comprises identification information of the at least one function.

4. The method of claim 1, further comprising:
   performing the data processing by the computational storage in response to receiving an input/output (I/O) request for adding new LBAs or updating the at least one subset of the LBAs.

5. The method of claim 1, further comprising:
   performing the data processing by the computational storage in response to receiving a request for the data processing from the host.

6. The method of claim 1, further comprising:
   performing the data processing by the at least one FPGA core in the computational storage.

7. The method of claim 6, wherein the performing the data processing by the at least one FPGA core comprises:
   reading metadata of the at least one transaction;
   identifying and loading the at least one function;
   identifying the at least one subset of the LBAs; and
   applying the at least one function to the at least one subset of the LBAs.

8. The method of claim 6, further comprising;
   delivering a result of the data processing to the host by a read operation;
   storing the result of the data processing to other LBAs; or
   storing the result of the data processing as updates of the at least one subset of the LBAs.

9. The method of claim 1, further comprising:
   updating a state of a file system volume based on performing the journal replay operations in the computational storage.

10. A system comprising:
    at least one processor; and
    at least one memory comprising computer-readable instructions that upon execution by the at least one processor cause the system to perform operations comprising:
    generating at least one transaction by a file system driver associated with a host, wherein the at least one transaction comprises logical block addresses (LBAs) and information associated with at least one function; and
    journaling the at least one transaction into a computational storage for offloading data processing from the host to the computational storage, wherein the computational storage comprises a persistent memory and at least one field-programmable gate array (FPGA) core, wherein the offloading of the data processing comprises offloading journal replay operations to the computational storage, wherein the journal replay operations comprise applying the at least one function to at least one subset of the LBAs by the at least one FPGA core based on the at least one transaction in the computational storage, and wherein the at least one transaction in the computational storage comprises codes or scripts associated with the at least one function and executable by the computational storage.

11. The system of claim 10, wherein the generating at least one transaction by a file system driver comprises:
    receiving a request for executing the at least one function; and
    encapsulating the request into the at least one transaction, wherein the at least one transaction comprises the codes or scripts associated with the at least one function, and the codes or scripts are to be executed by the computational storage.

12. The system of claim 10, the operations further comprising:
    creating at least one extended attribute of a file, wherein the at least one extended attribute comprises identification information of the at least one function.

13. The system of claim 10, the operations further comprising:
  performing the data processing by the computational storage in response to receiving an input/output (I/O) request for adding new LBAs or updating the at least one subset of the LBAs.

14. The system of claim 10, the operations further comprising:
  performing the data processing by the computational storage in response to receiving a request for the data processing from the host.

15. The system of claim 10, wherein the operations further comprising:
  reading metadata of the at least one transaction by the at least one FPGA core;
  identifying and loading the at least one function by the at least one FPGA core;
  identifying the at least one subset of the LBAs by the at least one FPGA core; and
  applying the at least one function to the at least one subset of the LBAs by the at least one FPGA core.

16. A non-transitory computer-readable storage medium, storing computer-readable instructions that upon execution by a processor cause the processor to implement operations, the operation comprising:
  generating at least one transaction by a file system driver associated with a host, wherein the at least one transaction comprises logical block addresses (LBAs) and information associated with at least one function; and
  journaling the at least one transaction into a computational storage for offloading data processing from the host to the computational storage, wherein the computational storage comprises a persistent memory and at least one field-programmable gate array (FPGA) core, wherein the offloading of the data processing comprises offloading journal replay operations to the computational storage, wherein the journal replay operations comprise applying the at least one function to at least one subset of the LBAs by the at least one FPGA core based on the at least one transaction in the computational storage, and wherein the at least one transaction in the computational storage comprises codes or scripts associated with the at least one function and executable by the computational storage.

17. The non-transitory computer-readable storage medium of claim 16, wherein the generating at least one transaction by a file system driver comprises:
  receiving a request for executing the at least one function; and
  encapsulating the request into the at least one transaction, wherein the at least one transaction comprises the codes or scripts associated with the at least one function, and the codes or scripts are to be executed by the computational storage.

18. The non-transitory computer-readable storage medium of claim 16, the operations further comprising:
  creating at least one extended attribute of a file, wherein the at least one extended attribute comprises identification information of the at least one function.

19. The non-transitory computer-readable storage medium of claim 16, the operations further comprising:
  performing the data processing by the computational storage in response to receiving an input/output (I/O) request for adding new LBAs or updating the at least one subset of the LBAs.

20. The non-transitory computer-readable storage medium of claim 16, the operations further comprising:
  performing the data processing by the computational storage in response to receiving a request for the data processing from the host.

* * * * *